United States Patent [19]

Winer

[11] Patent Number: 4,528,093
[45] Date of Patent: Jul. 9, 1985

[54] METHOD AND APPARATUS FOR PURIFYING AND DISPENSING WATER

[75] Inventor: Steven Winer, Boston, Mass.

[73] Assignee: Water Marketers, Inc., Boston, Mass.

[21] Appl. No.: 523,200

[22] Filed: Aug. 15, 1983

[51] Int. Cl.³ ............................................. B01D 31/00
[52] U.S. Cl. ................................. 210/96.2; 210/257.2; 210/416.3
[58] Field of Search ................... 210/96.1, 96.2, 10 A, 210/257.2, 416.3

[56] References Cited

U.S. PATENT DOCUMENTS

| | | | |
|---|---|---|---|
| 3,383,310 | 5/1968 | Ammer | 210/96.2 |
| 3,654,148 | 4/1972 | Bradley | 210/257.2 |
| 3,856,676 | 12/1974 | Grimme, Jr. et al. | 210/96.1 |
| 4,160,727 | 7/1979 | Harris, Jr. | 210/257.2 |

Primary Examiner—John Adee
Attorney, Agent, or Firm—Irving M. Kriegsman

[57] ABSTRACT

An apparatus and method for purifying and dispensing water for use in a coin operated vending machine is disclosed. The apparatus includes a pair of filters where the preliminary filtering of raw water occurs, a reverse osmosis unit pump and a reverse osmosis unit where the main purification takes place. The permeate output of the reverse osmosis unit passes through a conductivity sensor. If the conductivity is below a predetermined level, the water is sent to a storage tank. If the water is above that level then it is sent back to the reverse osmosis unit pump for further processing by the reverse osmosis unit. Water is extracted from the storage tank by a continuously operating pump which transmits the water through an ultraviolet sterilizer. During a vend cycle the water passing through the ultraviolet sterilizer is dispensed while in the absence of a vend cycle the water passing through the ultraviolet sterilizer is passed back into the storage tank. The apparatus further includes an arrangement for selectively adding to the dispensed water minerals for enhancing its taste and in addition an arrangement for selectively adding to the dispensed water electrolytes normally lost by a person during athletic or other strenuous activity.

2 Claims, 2 Drawing Figures

METHOD AND APPARATUS FOR PURIFYING AND DISPENSING WATER

BACKGROUND OF THE INVENTION

The present invention relates generally to treating and dispensing of water and more particularly to a method and apparatus for producing and dispensing highly purified water.

In U.S. Pat. No. 3,375,913 to S. B. Norris, Jr. there is disclosed a coin operated machine for vending either demineralized water, or demineralized water to which a predetermined quantity of minerals has been added to make the demineralized water suitable for drinking or other purposes. The machine includes a source of demineralized water, which can be a still, an ion exchange unit, or similar equipment connected to a municipal water unit, or similar equipment connected to a municipal water line, which source is connected to a coin operated unit for dispensing a measured quantity of water. A source of mineral-containing water is also provided, and is connected to the dispensing unit so that measured quantities of mineral-containing water can be selectively added to the demineralized water as is is being dispensed.

In U.S. Pat. No. 3,856,676 to H. L. Grimme Jr. there is disclosed an apparatus for purifying water taken from a well, municipal water system or other source including solids removal and then pressure filtration providing treated water and rejected water. A closed storage tank receives treated water only, with controls for operation of the pressure filtration at intervals to maintain water in the storage tank between selected levels and periodic flushing of the pressure filtration, the flushing water being discharged to the disposal of the rejected water. A water dispensing station apparatus moves the water from the storage tank to the dispensing station. A purity sensor and controls permits dispensing of only water meeting the purity requirements. Controls to stop operation and the dispensing of water in the event of any failure and a coin operated apparatus for controlling the dispensing for bulk vending of water are described.

In U.S. Pat. No. 4,160,727 to R. M. Harris, Jr. there is disclosed a method and apparatus utilizing successive reverse osmosis stages to produce highly purified water from potable water in a manner particularly suitable for use in a coin operated vending machines. The flow rate in the reverse osmosis stages are matched so that no storage tank is required between them. Operation of the purification stages is controlled by the level of purified water in a reservoir from which it is dispensed, and the level is automatically maintained within a predetermined range. A sump pan is mounted under the remainder of the machine to catch spillage, accidental overflow from the reservoir and the reject (brine) flow from the reverse osmosis stages. A sump pump is automatically actuated when the water reaches a predetermined level in the sump pan, and a valve at the feed water inlet is closed automatically in the event that the water level gets too high in either the reservoir or the sump pan. The machine will not accept coins in the event that the water in the reservoir drops to a predetermined level or fails to meet a desired standard of purity, and means is included for adding minerals to the purified water dispensed, if desired.

Other known U.S. patents of interest include:

| | |
|---|---|
| 2,600,719 (W. Wood) | 2,631,127 (G. F. D'Alelio) |
| 3,011,426 (R. J. Mueller) | 3,156,645 (J. W. Chapin) |
| 3,201,181 (S. B. Norris, Jr.) | 3,207,282 (S. B. Norris, Jr.) |
| 3,221,859 (K. E. McAbee) | 3,268,441 (R. W. Lindstrom) |
| 3,276,458 (A. H. Iverson et al) | 3,331,772 (E. R. Brownscombe) |
| 3,340,186 (P. K. Weyl) | 3,431,201 (ILS. Johnson et al) |
| 3,442,995 (A. L. Bennett et al) | 3,498,910 (M. Mendelson) |
| 3,505,216 (B. H. Kryzer) | 3,823,086 (K. A. Schmidt) |
| 3,870,033 (T. L. Faylor et al) | 4,156,621 (Andrews et al) |
| 4,161,445 (D. W. Coillet) | 4,206,048 (G. A. Guter) |
| 4,246,101 (H. W. Selby III) | |

It is an object of this invention to provide a new and improved method and apparatus for purifying and dispensing water.

It is another object of this invention to provide a method and apparatus for purifying and dispensing water which includes an arrangement for selectively adding to the purified water either minerals for improving its taste or electrolytes for quickly replacing electrolyte normally lost by a person as a result of athletic or other strenuous activity.

It is further object of this invention to provide a method and apparatus which includes a storage tank for storage of the water so purified and an arrangement to prevent any bacteria buildup within the storage tank.

It is still another object of this invention to provide a method and apparatus which includes a reverse osmosis unit and a conductivity sensor for monitoring the permeate output of the reverse osmosis unit and wherein water detected as being unsatisfactory by the conductivity sensor is not discharged to waste but rather is recycled through the reverse osmosis unit.

SUMMARY OF THE INVENTION

An apparatus for purifying and dispensing water according to the teachings of the present invention includes a flow line having an inlet connected to a source of raw water, filter means connected to the flow line for filtering said water, a reverse osmosis unit having a feed water inlet, a permeate outlet, a membrane and a concentrate outlet, a reverse osmosis pump having its inlet end connected to the outlet end of the filter means, a storage tank, valve means having an inlet end coupled to the permeate outlet of the reverse osmosis unit, an outlet connected to an inlet of the storage tank and an outlet connected to the inlet of the reverse osmosis pump, a conductivity sensor coupled between the valve means and the permeate outlet of the reverse osmosis unit for sensing the quality of the water emitted through the permeate outlet of the reverse osmosis unit and controlling the valve means so that the water passes either to the reverse osmosis unit pump or the storage tank, and means for dispensing water from the storage tank.

BRIEF DESCRIPTION OF THE DRAWINGS

In the drawings wherein like reference numerals represent like parts.

DETAILED DESCRIPTION OF THE PREFERRED EMBODIMENTS

Figure 1:
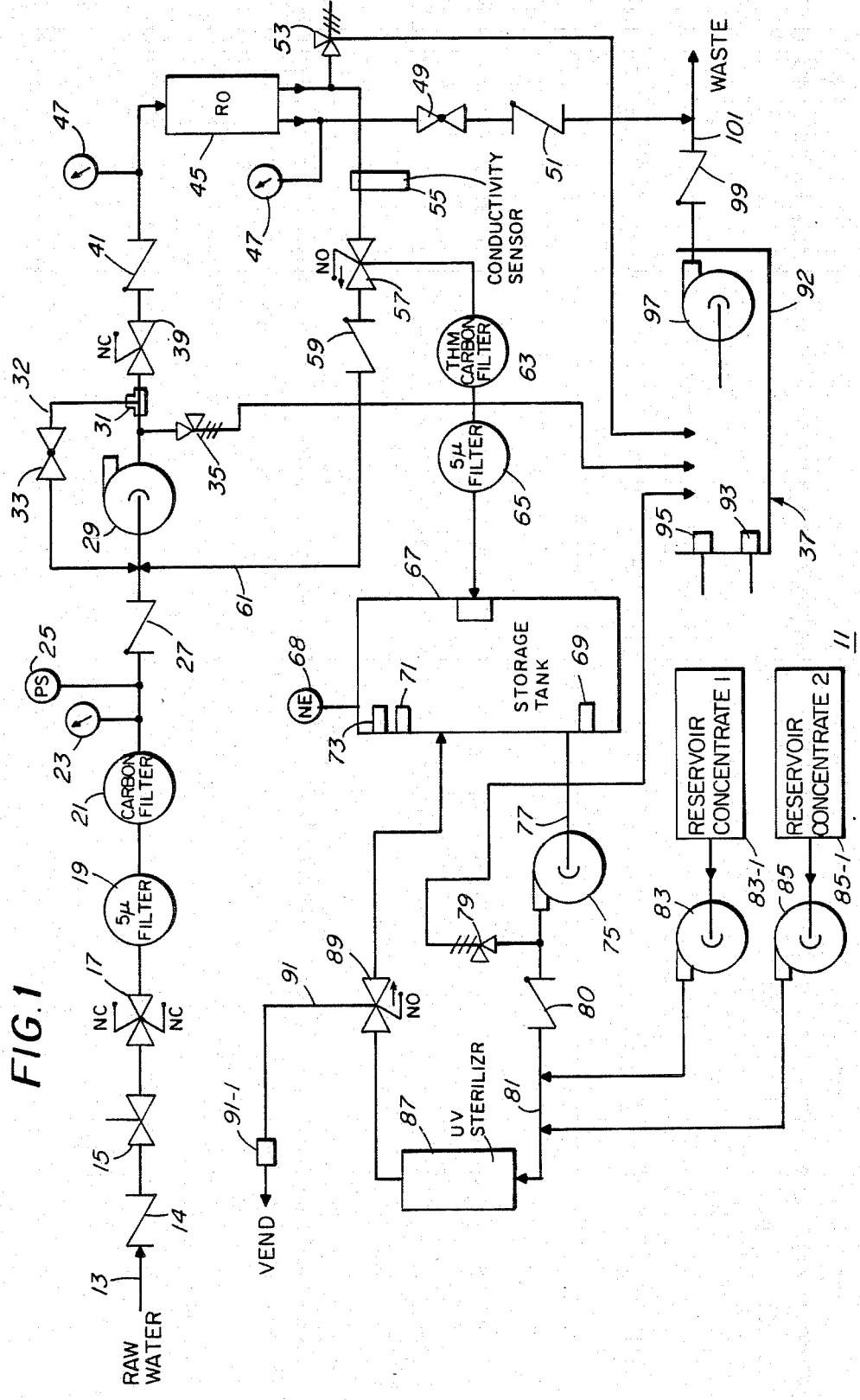
FIG. 1 is a diagramatic illustration of the flow system of one embodiment of an apparatus for purifying and dispensing water according to this invention.

Referring now to the drawings, there is illustrated in FIG. 1 an apparatus constructed according to the teachings of the present invention and identified generally by reference numeral 11.

Apparatus 11 includes an inlet line 13 which is adapted to be connected to a source of raw water, such as ordinary city or municipal water supply lines.

The raw water from inlet line 13 passes through a check valve 14 which is provided to prevent backflow of water from aparatus 11 to the source of raw water. From the check valve 14 the water passes through a manually operated normally open shut-off valve 15 and a redundant solenoid valve 17. Check valve 14 and shutoff valve 15 may be reversed in order. From the dual inlet solenoid valve 17, the water passes through a 5 micron to 25 micron filter 19 which removes large sediments or particulates and then through an activated carbon filter 21 which removes organic compounds and compounds such as found in pesticides and dissolved gases, in particular chlorine. From carbon filter 21 the water passes a pressure guage 23 which monitors the pressure in order to determine when filters 19 and/or 21 have to be changed, a pressure switch 25 and another check valve 27. Pressure switch 25 is arranged to shut of the reverse osmosis pump (to be later described) should the pressure arriving at that pump be inadequate for its operation. Switch 25 will not, however, prevent dispensing of processed water. Check valve 27 prevents water from going back through carbon filter 21. From check valve 27 the water passes into the inlet of a positive displacement high pressure pump 29 of the type commonly used with reverse osmosis units and which pressurizes the water to a magnitude of at least about 200 psi. The pressurized water emitted from pump 29 passes through a T connection or by-pass point 31 which allows some of the water to be passed over line 32 into pump 29, with the control for determining how much water is passed back being a normally closed needle valve 33. The amount of water passed back will depend on the water supply at the particular location. A pressure relief valve 35 is disposed along the path between the outlet of pump 29 and by-pass point 31. The pressure relief valve 35 is set so as to prevent damage to pump 29 or damage to a reverse osmosis unit (located downstream as will be hereinafter described) should there be an obstruction or blockage in the line. The overflow passing through relief valve 35 goes to a sump pump section 37.

From by-pass point 31, the water passes through a normally closed solenoid valve 39, through a checkvalve 41, which prevents further backflow, through a pressure gauge 43 which measures the pressure of the water coming off the pump 29 (to see if the pressure is at least 200 psi) and then into a reverse osmosis unit 45 where the major portion of the filtration takes place. The reverse osmosis unit 45 includes a feed water inlet, a premeate outlet, a membrane structure between the feed water inlet and the permeate outlet and a concentrate outlet on the same side of the membrane structure as the feed water inlet.

Reject water from reverse osmosis unit 45 is monitored by a pressure guage 47 which indicates the pressure of the reject water and passes through a needle valve 49 which controls the back pressure on reverse osmosis unit 45 and also the amount of water that is subsequently passes to waste through a check-valve 51 which prevents any waste water from coming back into the system.

The high quality water emitted from reverse osmosis unit 45 passes through a pressure relief valve 53 which prevents overpressurizing of the system in the event of a failure in the reverse osmosis unit 45.

From the pressure relief valve 53 the water passes through a conductivity sensor 55 which measures the quality of the water to insure that no water outside of the parameter of the design pass into the remainder of the system. Conductivity sensor 55 controls a normally open solenoid valve 57 located downstream from conductivity sensor 55. In the normally open position (i.e. if the conductivity of the water sensed by conductivity sensor 55 is too high), valve 57 will pass the water back throgh a checkvalve 59 to the inlet of pump 29 over line 61 for recycling. As can be appreciated, conductivity sensor 55 does not shut off the system, but rather, sends the water back to pump 29 (downstream of checkvalve 27) for further processing by reverse osmosis unit 45. As can also be appreciated, there are effecively two feedback paths, one path 32 for conserving water that is relatively low in mineral content and the other path 61 for returning water that does not meet the conductivity requirements.

On the other hand, if the conductivity of the water as determined by conductivity sensor 55 is satisfactory, solenoid valve 57 is closed (i.e. energized) allowing the high quality water to be passed on further through a THM carbon (i.e. activated carbon) filter 63, through another 5 micron to 5 micron filter 65, which entraps any potential breakoff of carbon from filter 63, into a sealed storage tank 67 which provides a supply of treated water for vending.

Sealed storage tank 67 includes a sub-micron (i.e. around 0.2 micron) vent filter 68 which prevents any airborne bacteria from entering the tank and is hydrophobic in design so as not to be adversely effected by moisture (when the water column rises or falls within the tank). Also within storage tank 67 is a low level control 69, a high level control 71 and an emergency shut-off control 73. Low level control 69 will deactivate the distribution portion of the system when the level drops below it, so that vending will not take place. This insures that there is adequate water in tank 67 to make a vend. High level control 71 will shut off the filtration section (i.e. elements 13 through 45) when storage tank 67 has an adequate supply. Emergency control 73 will shut off the entire system if the high level control fails to function, thereby preventing any overflow from tank 67.

A continuously operating distribution pump 75 has its inlet connected to storage tank 67 by a line 77. Water discharged by pump 75 passes a normally closed pressure relief valve 79 which is set at a pressure of 20–50 psi. Should the pressure exceed that value, valve 79 will open allowing the water to pass to sump section 37. If the pressure does not exceed that valve then the water will pass through a check valve 80 to a line 81. A first concentrate pump 83 and a second concentrate pump 85 which are each also connected to line 81. The inlet of first concentrate pump 83 is connected to a first reservior 83-1 and the inlet side of second concentrate pump 85 is connected to a second reservoir 85-1.

First reservoir 83-1 contains a concentrated solution of minerals for enhancing the flavor of the high quality water discharged through pump 75, such as for example a mixture of combination of magnesium sulfate, calcium chloride, sodium bicarbonate and sodium chloride. On the other hand, second reservoir 85-1 contains a concentrated solution of essential electrolytes which are normally lost during althetic or other strenuous activity and in the general proportions in which they are lost, such as for example a combination of potassium phosphate, sodium phosphate, potassium chloride, sodium chloride, magnesium chloride and calcium chloride. Concentrated solution 85-1 does not include any sugar.

From line 80 the water is passed through a UV system 87 to a three way solenoid 89 that will, in the absence of a vend cycle, allow the water to pass back into tank 67. During a vend cycle, valve 89 is energized and the product is dispensed through outlet line 91 connected to a dispensing nozzle 91-1.

Sump pump section 37 includes a sump pan 92 low level control 93, a high level control 95 and a pump 97. Pump 97 is energized when the level exceeds that of low level control 93. If the level exceeds that of high level control 95 the entire system will shut down. Water discharged by pump 97 is passed through a check valve 99 which avoids any potential back water contamination from waste water line 101.

Apparatus 11 also includes the necessary controls and electrical power for enabling either high quality water without additives to be dispensed or high quality water with additives from reservoir 83-1 to be dispensed or high quality water with additives from reservoir 85-1 to be dispensed.

Figure 2:
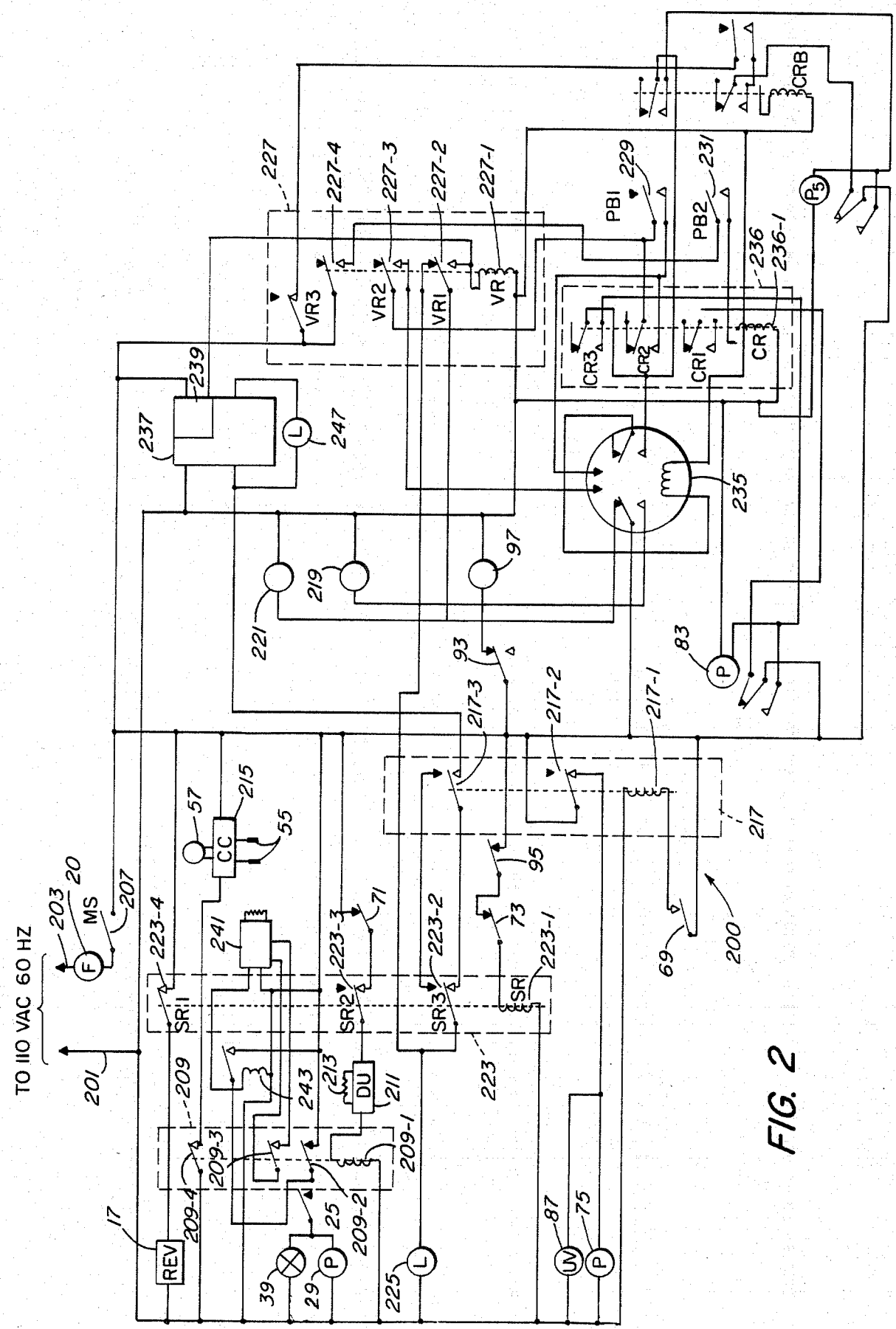
FIG. 2 is a diagram of the electrical circuit portion of the invention.

Referring now to FIG. 2, there is illustrated a diagram of the electrical circuit portion of apparatus 11, the circuit being identified generally by reference numeral 200. As can be seen, circuit 200 includes many of the components shown and already discussed in connection with FIG. 1.

Circuit 200 includes a pair of lines 201 and 203 which are adapted to be connected to a 110 VAC, 60 HZ voltage source (not shown). Line 203 includes a fuse 205 to protect against overload and a master switch 207 to connect or disconnect circuit 200 to the voltage source. A pump relay 209 having a coil 209-1 and three sets of contacts labelled 209-2, 209-3 and 209-4 controls the operation of pump 29 which is the pressurizing pump for reverse osmosis unit 45. Pump relay 209 is coupled to a delay unit 211 having a 50 K registor 213. A conductivity controller 215 controls the operation of valve 57 on information received from conductivity sensor. A low level relay 217 having a coil 217-1 and two sets of contacts 217-2 and 217-3 is operated by low level switch 69 in storage tank 67. Solenoid valves 219 and 221 are each two-way solenoid valves and are coupled in the same manner as and functionally equivalent to the three-way solenoid valve 89 shown in FIG. 1.

Safety relay 223 includes a coil 223-1 and three sets of contacts labelled 223-2, 223-3 and 223-4. Safety relay is coupled to low level control 93 in sump 37, high level control 71 in storage tank 67 and emergency control 73 in storage tank 67. In any one of these three controls is activated, safety relay 334 will be opened. An out-of-order lamp 225 is coupled to low level relay 217 and safety relay 223. If either one of these relays is activated, lamp 225 will be energized. Low level relay 217 is coupled to low level control 69. If low level control 69 is activated, relay 217 will be opened, turning off UV sterilizer 87 and dispensing pump 75 and turning on out-of-order lamp 225.

A vend relay 227 having a coil 227-1 and three sets of contacts labelled 227-2, 227-3 and 227-4 is actuated by any one of the three selection switches 229, 231 and 233. If selection switch 229 is tripped, neither one of the concentrate pumps 83 and 85 will operate. If selection switch 231 is tripped, concentrator pup 83 will operate. If selection switch 233 is tripped, concentrator pump 85 will operate. Switches 229, 231 and 233 are coupled to a timer 235 through a concentrate pump relay 236 having a coil 236-1 and four sets of contacts labelled 236-2, 236-3, 236-4 and 236-5.

Circuit 200 further includes a coin return electromagnet 237, a coin switch 239, an on-delay timer 241, an on-delay timer relay 243 and a use-correct-change-only lamp 247.

It is apparent from the foregoing that a new and improved method and apparatus for purifying and dispensing water have been provided. While only the preferred embodiments have been described, as will be apparent to those familiar with the art, certain changes and modifications can be made without departing from the scope of the invention as defined by the following claims.

What is claimed is:

1. In an apparatus for purifying and dispensing water the combination comprising:
   a. a flow line having an inlet connected to a source of raw water,
   b. filter means connected to the flow line for filtering said water,
   c. a reverse osmosis unit having a feed water inlet, a permeate outlet, a membrane and a concentrate outlet,
   d. a reverse osmosis pump having its inlet end connected to the outlet end of the filter means,
   e. a storage tank,
   f. valve means having an inlet end coupled to the permeate outlet of the reverse osmosis unit, an outlet connected to an inlet of the storage tank and an outlet connected to the inlet of the reverse osmosis pump,
   g. a conductivity sensor coupled between the valve means and the permeate outlet of the reverse osmosis unit for sensing the quality of the water emitted through the permeate outlet of the reverse osmosis unit and controlling the valve means so that the water passes either to the reverse osmosis unit pump or the storage tank and
   h. means for dispensing water from the storage tank,
   i. said means for dispensing water from the storage tank comprising:
      i. outlet means,
      ii. a continuously operating distribution pump having an inlet end connected to an outlet on the storage tank and an outlet,
      iii. an ultraviolet sterilizer coupled to the outlet end of the distribution pump,
      iv. valve means coupled to the outlet end of the ultraviolet sterilizer, the outlet means and an inlet on the storage tank,
      v. means for selectively adding a first solution of minerals to the water being dispensed to enhance its taste, and
      vi. means for selectively adding a second solution of electrolytes to the water being dispensed to provide a water mixture that will rapidly replenish electrolytes lost by a person during athletic or other strenuous activity.

2. The apparatus of claim 1 and further including a delay unit for delaying the shutoff time of the reverse osmosis pump after the storage tank has reached a predetermined level so that water from the permeate outlet of the reverse osmosis unit may be recirculated through the reverse osmosis unit for purging purposes.

* * * * *